(12) United States Patent
Norman

(10) Patent No.: US 7,301,953 B1
(45) Date of Patent: Nov. 27, 2007

(54) METHOD AND SYSTEM FOR TRANSPORTING A SECONDARY COMMUNICATION SIGNAL WITH A PRIMARY COMMUNICATION SIGNAL

(75) Inventor: Charles William Norman, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 43 days.

(21) Appl. No.: 09/899,583

(22) Filed: Jul. 6, 2001

Related U.S. Application Data

(63) Continuation of application No. 09/085,539, filed on May 26, 1998, which is a continuation of application No. 08/731,818, filed on Oct. 22, 1996, now abandoned.

(51) Int. Cl.
*H04L 12/28* (2006.01)
*H04J 3/12* (2006.01)

(52) U.S. Cl. .................. 370/401; 370/523; 370/528

(58) Field of Classification Search ........ 370/465–466, 370/463, 539, 476, 360, 520, 536, 907, 535, 370/537, 138, 245, 216–228, 474, 403, 401, 370/523–528, 538, 248, 514–515; 714/1; 340/825.01
See application file for complete search history.

(56) References Cited

U.S. PATENT DOCUMENTS

| | | | |
|---|---|---|---|
| 4,213,201 A | 7/1980 | Gagnier et al. | |
| 5,040,170 A | 8/1991 | Upp et al. | |
| 5,159,595 A * | 10/1992 | Flanagan et al. | 370/224 |
| 5,179,548 A | 1/1993 | Sandesara | |
| 5,185,736 A | 2/1993 | Tyrrell et al. | |
| 5,218,604 A | 6/1993 | Sosnosky | |
| 5,307,353 A | 4/1994 | Yamashita et al. | |
| 5,315,594 A | 5/1994 | Noser | |
| 5,327,427 A | 7/1994 | Sandesara | |
| 5,341,364 A | 8/1994 | Marra et al. | |
| 5,343,464 A | 8/1994 | Iino et al. | |
| 5,365,518 A | 11/1994 | Noser | |
| 5,390,164 A | 2/1995 | Kremer | |
| 5,406,401 A | 4/1995 | Kremer | |
| 5,416,768 A * | 5/1995 | Jahromi | 370/403 |
| 5,416,772 A | 5/1995 | Helton et al. | |
| 5,434,858 A * | 7/1995 | Shimada | 370/373 |
| 5,440,540 A | 8/1995 | Kremer | |
| 5,448,389 A | 9/1995 | Peacock | |
| 5,465,252 A | 11/1995 | Muller | |
| 5,471,476 A | 11/1995 | Hiramoto | |
| 5,473,611 A | 12/1995 | Gilboa et al. | |

(Continued)

*Primary Examiner*—Steven Nguyen

(57) ABSTRACT

The method and system provide for transporting a secondary communication signal from a secondary carrier network with a primary communication signal from a primary carrier network. The method and system load the overhead from the secondary communication signal into unused bytes of the primary communication signal, thereby creating a transport overhead. The payload from each of the secondary communication signal and the primary communication signal are combined, thereby creating a transport payload. The transport payload is combined with the transport overhead to form a transport communication signal. The transport communication signal is sent to a destination where the transport communication signal is disassembled. The secondary communication signal's overhead and payload are removed from the transport communication signal and transmitted in a secondary communication signal to the secondary carrier network. Likewise, the primary communication signal's overhead and payload are removed from the transport communication signal and transmitted in a primary communication signal to the primary carrier network.

20 Claims, 2 Drawing Sheets

U.S. PATENT DOCUMENTS

| | | |
|---|---|---|
| 5,506,956 A | 4/1996 | Cohen |
| 5,526,344 A | 6/1996 | Diaz et al. |
| 5,546,403 A | 8/1996 | Yamamoto et al. |
| 5,550,805 A | 8/1996 | Takatori et al. |
| 5,555,477 A | 9/1996 | Tomooka et al. |
| 5,577,196 A | 11/1996 | Peer |
| 5,600,648 A * | 2/1997 | Furuta et al. ............... 370/248 |
| 5,638,356 A | 6/1997 | Hijikata |
| 5,663,949 A | 9/1997 | Ishibashi et al. |
| 5,754,528 A | 5/1998 | Uchida |
| 5,857,092 A | 1/1999 | Nakamura et al. |
| 5,896,378 A | 4/1999 | Barker |
| 5,905,585 A | 5/1999 | Shirai |
| 6,011,802 A | 1/2000 | Norman |
| 6,169,754 B1 * | 1/2001 | Sugawara et al. .......... 370/535 |
| 6,295,615 B1 | 9/2001 | Cohen |

* cited by examiner

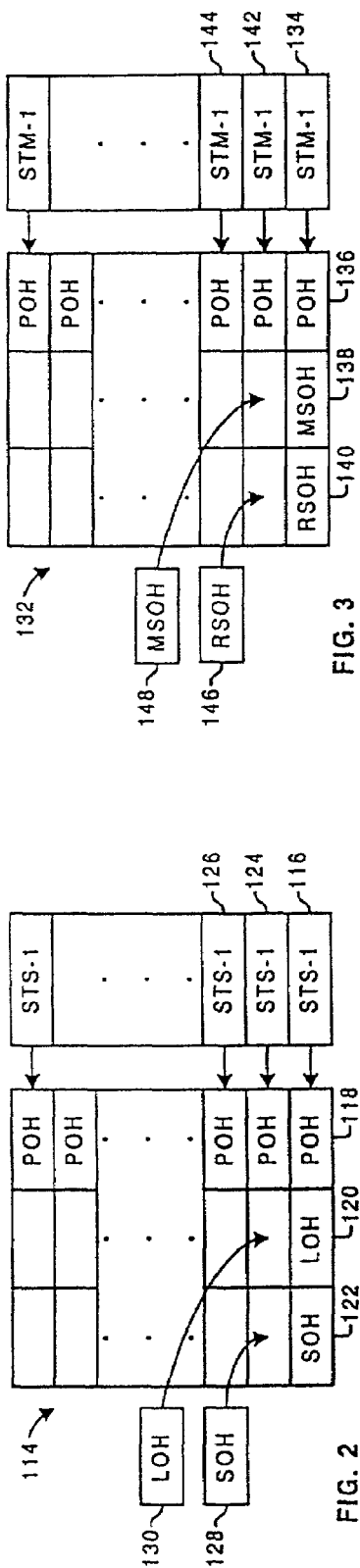
FIG. 2
FIG. 3
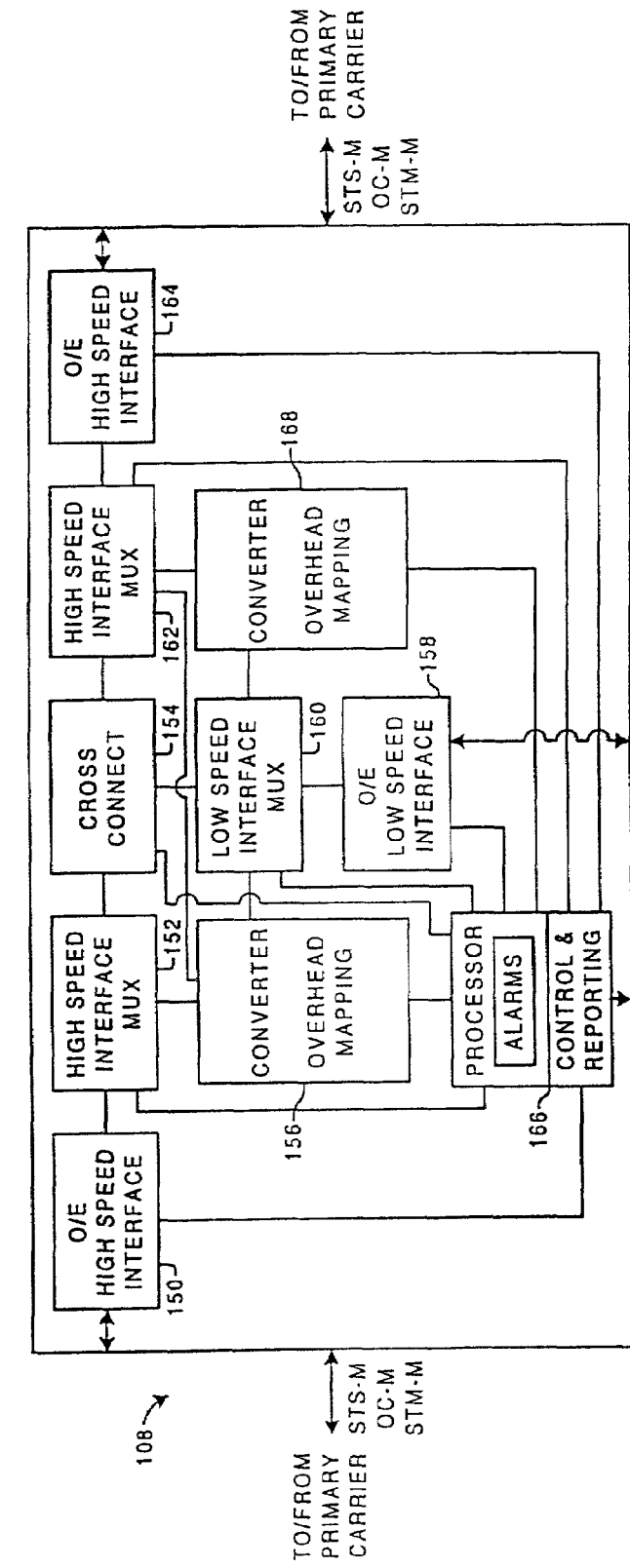
FIG. 4

METHOD AND SYSTEM FOR TRANSPORTING A SECONDARY COMMUNICATION SIGNAL WITH A PRIMARY COMMUNICATION SIGNAL

RELATED APPLICATIONS

This patent application is a continuation of pending U.S. patent application Ser. No. 09/085,539, entitled "Method And System For Transporting A Secondary Communication Signal With A Primary Communication Signal," filed on May 26, 1998, which is a continuation of U.S. patent application Ser. No. 08/731,818 filed Oct. 22, 1996 now abandoned, is assigned to the same entity as this Application, and is hereby incorporated by reference into this Application.

FEDERALLY SPONSORED RESEARCH OR DEVELOPMENT

Not applicable.

MICROFICHE APPENDIX

Not applicable.

FIELD OF THE INVENTION

The present invention is directed to a method and a system for transporting communication signals in synchronous carrier networks.

SUMMARY OF THE INVENTION

In one embodiment, the present invention is an apparatus for transporting a communication signal. A synchronous secondary carrier network has a secondary communication signal and a synchronous primary carrier network has a primary communication signal. The secondary communication signal has secondary overhead and the primary communication signal has primary overhead. The primary overhead has unused overhead space. The apparatus comprises an adapter assembly adapted to receive the secondary communication signal from the secondary carrier network and the primary communication signal from the primary carrier network. The adapter assembly is further adapted to load the secondary overhead into the unused overhead space of the primary overhead to form a transport overhead. The adapter assembly is also adapted to transmit the transport overhead in a transport communication signal to the primary carrier network.

In another embodiment, the present invention is an apparatus for transporting a communication signal. A synchronous primary carrier network has a transport communication signal to be transported to a secondary carrier network. The transport communication signal has a transport overhead, and the transport overhead contains a secondary overhead. The apparatus comprises an adapter assembly adapted to receive the transport signal from the primary carrier network, to remove the secondary overhead from the transport overhead, and to transmit the secondary overhead in a secondary communication signal to the secondary network In yet another embodiment, the present invention is a method for transporting a secondary communication signal from a synchronous secondary carrier network on a synchronous primary carrier network which has a primary communication signal. The secondary communication signal has secondary overhead and the primary communication signal has primary overhead. The primary overhead has unused overhead space. The method comprises loading the secondary overhead into the unused overhead space of the primary overhead to form a transport overhead. The method includes transmitting the transport overhead in a transport communication signal to the primary carrier network.

In another embodiment, the present invention is directed to a method for transporting a transport communication signal from a synchronous primary carrier network to a synchronous secondary carrier network. The transport communication signal has a transport overhead. The transport overhead contains a secondary overhead. The method comprises removing the secondary overhead from the transport overhead and transmitting the secondary overhead in a secondary communication signal to the secondary network.

The present invention is also directed to a system for transporting a secondary communication signal from a synchronous secondary carrier network on a synchronous primary carrier network which has a primary communication signal. The secondary communication signal has secondary overhead and the primary communication signal has primary overhead. The primary overhead has unused overhead space. The system comprises a first adapter assembly adapted to receive the secondary communication signal from the secondary carrier network and the primary communication signal from the primary carrier network. The first adapter assembly is adapted to load the secondary overhead into the unused overhead space of the primary overhead to form a transport overhead and to transmit the transport overhead in a transport communication signal to the primary carrier network.

The system further comprises a second adapter assembly adapted to receive the transport communication signal from the primary carrier network. The second adapter assembly is further adapted to remove the secondary overhead from the transport overhead and to transmit the secondary overhead in a second secondary transport communication signal to the secondary network.

DESCRIPTION OF THE DRAWINGS

FIG. 2 is a relational diagram of the preferred placement of a secondary carrier communication signal overhead in a synchronous optical network communication signal from a primary carrier network.

FIG. 3 is a relational diagram of the preferred placement of a secondary carrier communication signal overhead in a synchronous digital hierarchy communication signal from a primary carrier network.

FIG. 4 is a block diagram of the adapter assembly of the present invention.

DETAILED DESCRIPTION OF THE PREFERRED EMBODIMENT

Figure 1:
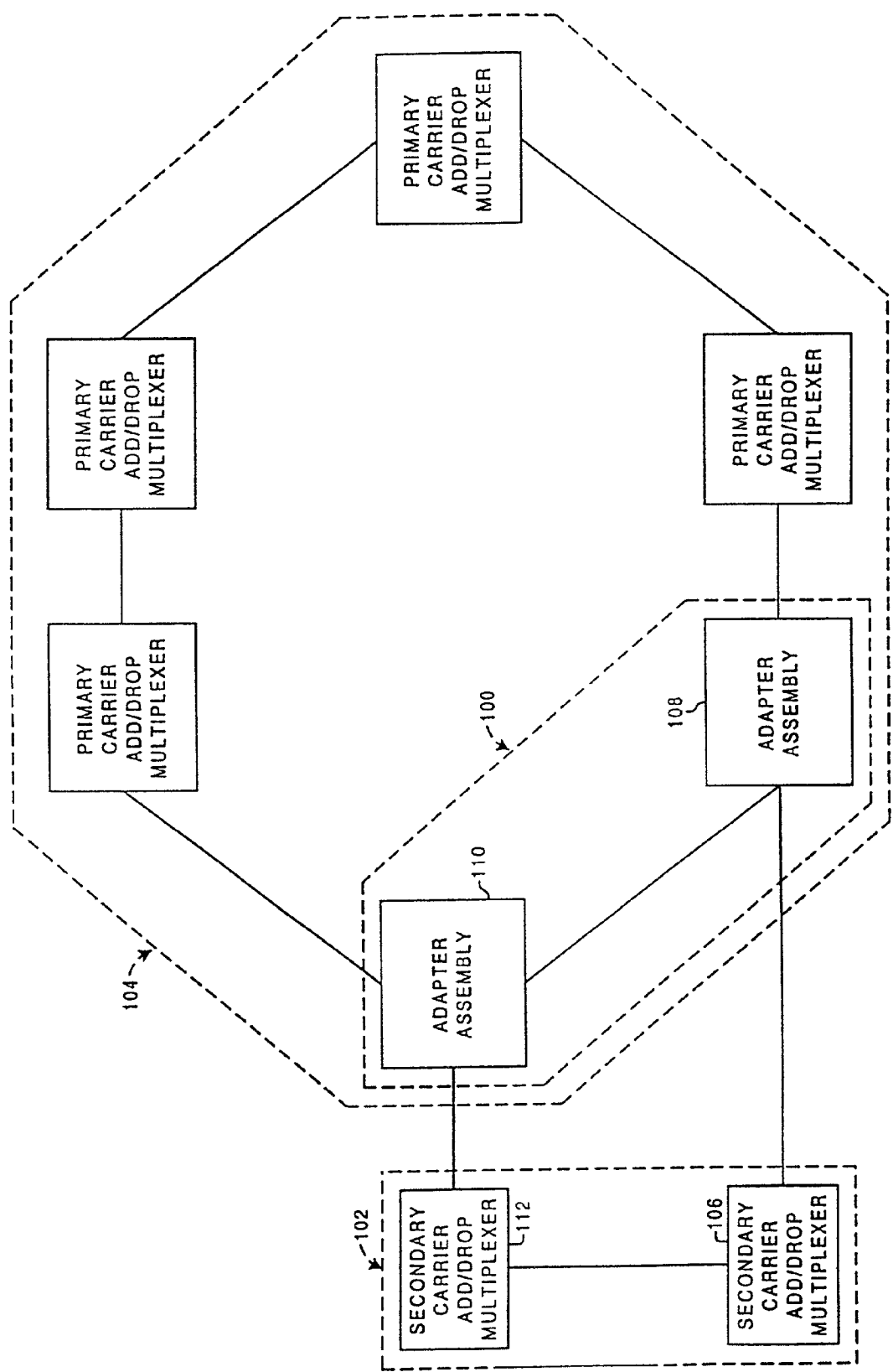
FIG. 1 is a functional diagram of an adapter system in accordance with the present invention in which an adapter assembly interacts between a primary carrier network and a secondary carrier network.

Synchronous carrier networks, such as synchronous optical network (SONET) and synchronous digital hierarchy (SDH), transport synchronous communication signals through spans of the network to points of destination. A span refers to network equipment, such as add/drop multiplexers, that allow communication signal traffic to be received into, delivered from, or carried on the carrier network and the pipes between the network equipment upon which the communication signals are carried. These spans generally form a ring configuration so that traffic can be delivered bi-directionally around the ring.

The communication signals have information payloads and overhead. The overhead contains operation, administration, and maintenance information (OAM) that allows the carrier networks to provide error checking and control. The overhead includes section overhead (SOH) and line overhead (LOH) for SONET networks, and regenerator section overhead (RSOH) and multiplexer section overhead (MSOH) for SDH networks. In addition, both SONET and SDH communication signals include a higher order path overhead (POH) as part of the payload.

Because the synchronous carrier networks operate according to common protocols, multiple communication signal carriers may interact. For example, a primary carrier, such as an interexchange carrier (IXC) or a private carrier, may receive communication signals from, or transport communication signals to, a second primary carrier or to a secondary carrier, such as a local exchange carrier (LEC) or a second private carrier. Likewise, a secondary carrier may receive communication signals from, or transport communication signals to, a primary carrier or another secondary carrier.

In addition, a carrier network may use part of another carrier network to carry traffic. Such a situation may arise, for example, when a secondary carrier network has a break in a pipe of a span between two pieces of equipment. Then, the secondary carrier network may use the primary carrier network in a protection mode to reroute the traffic to its intended destination. Alternately, the secondary carrier network may lease a portion of the primary carrier network so that the traffic may be routed to a destination for which the secondary carrier network does not have network equipment.

Unfortunately, when a secondary carrier network transfers a communication signal to a primary carrier network, the overhead which contains the OAM is lost. Thus, normally, a secondary carrier network cannot use the primary carrier network because the overhead from the secondary carrier network's communication signal is terminated and replaced with the overhead from the primary carrier network. This occurs because the synchronous carrier network protocol standards only allow one overhead in a transmission span.

Therefore, a system is needed to allow a secondary carrier network's overhead to be transported over a primary carrier network. The present invention fills this need.

As illustrated in FIG. 1, the system 100 and method of the present invention allow a secondary carrier network 102 to use a primary carrier network 104 to transport communication signals, including the payload and the overhead from the secondary carrier network's communication signals. The primary carrier network generally has a higher transport rate than the secondary carrier network.

A transport rate defines the size, speed, and multiplexing level of a carrier network. An optical carrier level three (OC-3) carrier network, for example, transports communication signals at a rate of 155.52 Mega-bits per second (Mbps). An optical carrier level twelve (OC-12) carrier network transports communication signals at a rate of 622.08 Mbps. Four OC-3s can be combined or multiplexed up to an OC-12. As illustrated, the OC-12 has a higher transport rate and a higher multiplexing level than the OC-3.

The secondary carrier 102 has a transport rate, such as optical carrier level N (OC-N), synchronous transport signal level N (STS-N), or synchronous transport module level N (STM-N). As used in conjunction with the secondary carrier transport rate herein, "N" means a transport rate that can transport communication signals at a transmission multiplexing rate of N signals, where N can be any number from zero to infinity minus one.

The primary carrier 104 has a transport rate, such as OC-M, STS-M, or S™-M. As used in conjunction with the primary carrier transport rate herein, "M" means a transport rate that can transport communication signals at a transmission multiplexing rate of M signals, where M can be any number from one to infinity. Generally, M is greater than N.

The system 100 is used in conjunction with the secondary carrier network 102. A piece of equipment in the secondary carrier network 102, such as an add/drop multiplexer 106 (ADM), transports a secondary communication signal to a primary carrier network 104 piece of equipment, such as an adapter assembly 108.

The adapter assembly is part of the system 100. Because the adapter assembly 108 has a function that operates similar to an add/drop multiplexer, the adapter assembly 108 can deliver and receive communication signals to and from other carrier networks. Thus, the adapter assembly 108 can receive one or more secondary communication signals from the secondary carrier 102, as well as one or more primary communication signals from its own network.

The adapter assembly 108 "hides" the secondary communication signal overhead in the primary communication signal overhead, thereby creating a transport overhead. The adapter assembly 108 then combines the payloads from the primary communication signal and the secondary communication signal, thereby creating a transport payload. The adapter assembly 108 combines the transport overhead with the transport payload to create a transport communication signal.

The system 100 also has a another adapter assembly 110 which is identical to the above-described adapter assembly 108. The adapter assembly 108 transmits the transport communication signal to the second adapter assembly 110 in the primary carrier network 104. The second adapter assembly 110 pulls the secondary overhead and the secondary payload from the transport communication signal and transmits the overhead and payload in a secondary carrier communication signal to a secondary carrier piece of equipment, such as an ADM 112. The ADM 112 thus receives the secondary payload and the secondary overhead at the destination point.

The adapter assembly 108 is able to hide the secondary communication signal's overhead in the primary communication signal because the primary communication signal has multiple signal components multiplexed together, but only has one set of overhead. The one set of overhead resides in the first or lowest level signal component. Therefore, the primary communication signal has unused space, such as unused overhead bytes, where the overhead would normally reside in the upper level signal components. The M and N level signal components are the uppermost level for the respective communication signals. The overhead from the secondary communication signal can be loaded into any of the unused spaces.

Because the overhead from the secondary communication signal is loaded into the unused space in the primary communication signal, the primary communication signal is greater than an STS-1, OC-1, or S™-1 level communication signal when the secondary communication signal is an STS-1, OC-1, or S™-1, respectively. Thus, for example, an STS-M primary carrier network which carriers an STS-M primary communication signal has a greater transport rate than an STS-N secondary carrier network which carries a secondary communication signal. The same is true for OC-M primary and OC-N secondary networks, STM-M primary and STM-N secondary networks, or other carrier networks.

For example, as illustrated in FIG. 2, an STS-M communication signal 114 has a plurality of M STS-1 component signals multiplexed together. The first STS-1 component signal 116 has a POH 118, an LOH 120, and an SOH 122. The other STS component signals, such as the second STS-1 component signal 124, and the third STS-1 component signal 126, have a POH, but they do not have an SOH or LOH. The adapter assembly 108 (FIG. 1) of the present invention loads the SOH 128 and LOH 130 from the secondary communication signal into these unused SOH and/or LOH bytes in the primary communication signal's overhead. It will be appreciated that this can be accomplished for any SONET communication signal in which a higher level primary communication signal is to carry a lower level secondary communication signal payload and overhead.

The same method can be used for SDH communication signals. For example, as illustrated in FIG. 3, an STM-M communication signal 132 has a plurality of M STM-1 component signals multiplexed together. The first STM-1 component signal 134 has a POH 136, an MSOH 138, and an RSOH 140. The other S™ component signals, such as the second STM-1 component signal 142, and the third STM-1 component signal 144, have a POH, but they do not have an MSOH or an RSOH. The adapter assembly 108 (FIG. 1) of the present invention loads the RSOH 146 and the MSOH 148 from the secondary communication signal into these unused MSOH and RSOH bytes in the primary communication signal's overhead. It will be appreciated that this can be accomplished for any SDH communication signal in which a higher level primary communication signal is to carry a lower level secondary communication signal payload and overhead.

The adapter assembly 108 is more fully detailed in FIG. 4. The adapter assembly 108 transmits communication signals between a primary carrier network and a secondary carrier network (see FIG. 1). The adapter assembly 108 receives and transmits synchronous communication signals such as SONET communication signals and SDH communication signals at multiple levels, including STS, OC, STM optical, and STM electrical.

The adapter assembly 108 receives a primary communication signal from a primary carrier network at a first interface, such as a high speed interface 150. The high speed interface 150 can accept optical or electrical (O/E) communication signals. If the primary communication signal is in an optical format, the high speed interface 150 converts the primary communication signal into an electrical format. The high speed interface 150 then transfers the primary communication signal to a first multiplexer, such as a high speed interface multiplexer 152.

The high speed interface multiplexer 152 has a special function that analyzes the overhead of the primary communication signal. This function allows the high speed interface multiplexer 152 to determine if overhead exists in any of the component signals other than the first component signal. In this manner, the high speed interface multiplexer 152 can determine if unused space exists and the location of the unused space. A secondary communication signal's overhead may be placed in this unused space.

The high speed interface multiplexer 152 breaks down the primary communication signal into a primary payload and a primary overhead. The primary payload is transferred to a cross connect 154, and the primary overhead is transferred to a converter 156. It will be appreciated that the high speed interface 150 and the high speed interface multiplexer 154 may be combined into one element.

Similarly, a secondary communication signal may be received from a secondary carrier network at a second interface, such as a low speed interface 158. The low speed interface 158 can accept optical or electrical (O/E) communication signals. If the secondary communication signal is in an optical format, the low speed interface 158 converts the secondary communication signal into an electrical format. The low speed interface 158 then transfers the secondary communication signal to a second multiplexer, such as a low speed interface multiplexer 160.

The low speed interface multiplexer 160 breaks down the secondary communication signal into a secondary payload and a secondary overhead. The secondary payload is sent to the cross connect 154, and the secondary overhead is sent to the converter 156. It will be appreciated that the low speed interface 158 and the low speed interface multiplexer 160 may be combined into one element.

The cross connect 154 combines the primary payload and the secondary payload. The cross connect 154 grooms the payloads at a specified multiplexing level and combines them to form a transport payload. In addition, the cross connect 154 may incorporate payloads from other communication signals into the transport payload. The cross connect 154 then transfers the transport overhead to a third multiplexer, such as a high speed interface multiplexer 162.

The converter 156 inserts the secondary overhead into the unused bytes of the primary overhead, thereby creating a new transport overhead. This involves mapping the secondary overhead into the space that is available in the primary overhead. After loading the secondary overhead into the primary overhead, the converter 156 transfers the transport overhead to the high speed interface multiplexer 162.

The high speed interface multiplexer 162 combines the transport overhead with the transport payload to form a transport communication signal. The high speed interface multiplexer 162 then transfers the transport communication signal to a third interface, such as a high speed interface 164.

The high speed interface 164 transmits the transport communication signal to the primary carrier network. The high speed interface 164 may transmit optical or electrical (O/E) communication signals. The high speed interface 164 converts the transport communication signal to an optical format, if required, before transmitting it to the primary carrier network. It will be appreciated that the high speed interface 164 and the high speed interface multiplexer 162 may be combined into one element.

The adapter assembly 108 also has a processor 166 which controls all of the reception and transmission of the communication signals. In addition, the processor 166 controls loading the overhead from the secondary communication signal into the overhead from the primary communication signal to create the transport overhead. The processor 166 can accept command and control information from the primary carrier network and the secondary carrier network. Moreover, if an error occurs in the reception, transmission, or conversion of the communication signals, the processor 166 sends an alarm to one or both of the carrier networks.

The adapter assembly 108 can also accept a transport communication signal from a primary carrier network. The transport communication signal contains a transport overhead and a transport payload. The transport payload has at least a primary payload and a secondary payload. Similarly, the transport overhead has at least a primary overhead and a secondary overhead.

When receiving a transport communication signal, the adapter assembly 108 operates in a manner which is the reverse of that described above. The adapter assembly 108 receives the transport communication signal at an interface, such as the high speed interface 164.

The high speed interface 164 converts the transport signal from an optical format to an electrical format if required. The high speed interface 164 then transfers the transport communication signal to a multiplexer, such as a high speed interface multiplexer 162.

The high speed interface multiplexer 162 has a special function that analyzes the overhead of the transport communication signal. This function allows the high speed interface multiplexer 162 to determine if overhead exists in any of the component signals in the transport signal other than the first component signal. In this manner, the high speed interface multiplexer 162 can determine if a secondary overhead has been loaded with a primary overhead into the transport overhead.

The high speed interface multiplexer 162 separates the transport payload from the transport overhead. The transport payload is transferred to a cross connect 154, and the transport overhead is transported to a converter 156. It will be appreciated that the high speed interface 164 and the high speed interface multiplexer 162 may be combined into one element.

It will be appreciated that, for convenience, a second converter 168 can be included in the adapter assembly 108 to convert the transport overhead. In such a configuration, the converter 156 would function to load the secondary overhead into the primary overhead when transporting a transport communication signal to the primary network. In addition, the second converter 168 would function to remove the secondary overhead from the primary overhead when receiving a transport communication signal.

The cross connect 154 separates the primary payload and the secondary payload out of the transport payload. The cross connect 154 transfers the secondary payload to a second multiplexer, such as a low speed interface multiplexer 160, and the primary payload to a third multiplexer, such as a high speed interface multiplexer 152.

In addition, the cross connect 154 may separate from the transport payload other payload from another source. This other payload may be groomed at the cross connect 154 and sent in another communication signal through one of the multiplexers 152 or 160 or through a fourth multiplexer (not shown).

The converter 156 removes the secondary overhead and the primary overhead from the transport overhead. The converter 156 then transfers the secondary overhead to a second multiplexer, such as the low speed interface multiplexer 160, and the primary overhead to a third multiplexer, such as the high speed interface multiplexer 152.

Moreover, the converter 156 may separate from the transport overhead a third overhead from one or more third sources. This third overhead may be sent in another communication signal through one of the multiplexers 152 or 160 or through a fourth multiplexer (not shown).

The low speed interface multiplexer 160 combines the secondary overhead with the secondary payload to form a secondary communication signal. The low speed interface multiplexer 160 then transfers the secondary communication signal to a second interface, such as a low speed interface 158.

The low speed interface 158 controls transmitting the secondary communication signal to the secondary carrier network 102 (FIG. 1). The low speed interface 158 converts the secondary communication signal to an optical format, if required, and then transmits the secondary communication signal. It will be appreciated that the low speed interface 158 and the low speed interface multiplexer 160 may be combined into one element.

The high speed interface multiplexer 152 combines the primary overhead with the primary payload to form a primary communication signal. The high speed multiplexer 152 then transfers the secondary communication signal to a third interface, such as the high speed interface 150.

The high speed interface 150 controls transmitting the primary communication signal to the primary carrier network. The high speed interface 150 converts the primary communication signal to an optical format, if required, prior to transmitting the primary communication signal to the primary carrier network. It will be appreciated that the high speed interface 150 and the high speed interface multiplexer 152 may be combined into one element.

The adapter assembly 108 also has a processor 166 which controls all of the reception and transmission of the communication signals. In addition, the processor 166 controls removing the secondary overhead and the primary overhead from the transport overhead. The processor 166 can accept command and control information from the primary carrier network and the secondary carrier network. Moreover, if an error occurs in the reception, transmission, or conversion of the communication signals, the processor 166 sends an alarm to one or both of the carrier networks.

It will be appreciated that the system described above may be modified to incorporate various other carrier network equipment. For example, a terminal multiplexer may be used instead of the add/drop multiplexer of the preferred system described above.

By using the above described system and method, a primary carrier can provide communication signal transfer services to a secondary carrier network 102 (FIG. 1). The overhead which contains the OAM now can be transported with the payload from the secondary communication signal.

Although embodiments of the present invention have been illustrated in the accompanying drawings and described in the detailed description, it will be understood that the invention is not limited to the embodiments disclosed, but is capable of numerous rearrangements, modifications, and substitutions of parts and elements without departing from the scope and spirit of the invention. In addition, it will be appreciated that other devices may be used that provide the same functions as the device elements described above.

What is claimed is:

1. A method of operating a primary communication system to provide a communication service to a secondary communication system, the method comprising:

in a first adaptor assembly, receiving a primary communication signal from the primary communication network, wherein the primary communication signal has primary overhead and a primary payload;

in the first adaptor assembly, receiving a secondary communication signal from first equipment in the secondary communication network, wherein the secondary communication signal has secondary overhead and a secondary payload;

in the first adaptor assembly, locating unused space in the primary overhead, inserting the secondary overhead into the unused space in the primary overhead to form transport overhead, combining the primary payload and the secondary payload to form a transport payload, and combining the transport overhead and the transport payload to form a transport communication signal;

transferring the transport communication signal from the first adaptor assembly to a second adaptor assembly;

in the second adaptor assembly, removing the secondary overhead and the secondary payload from the transport communication signal and combining the secondary overhead and the secondary payload to form the secondary communication signal; and transferring the secondary communication signal from the second adaptor assembly to second equipment in the secondary communication network.

2. The method of claim 1 wherein the unused space comprises unused Synchronous Optical Network (SONET) Line Overhead (LOH) space.

3. The method of claim 1 wherein the unused space comprises unused Synchronous Optical Network (SONET) Section Overhead (SOH) space.

4. The method of claim 1 wherein the unused space comprises unused Synchronous Digital Hierarchy (SDH) Multiplexer Section Overhead (MSOH) space.

5. The method of claim 1 wherein the unused space comprises unused Synchronous Digital Hierarchy (SDH) Regenerator Section Overhead (RSOH) space.

6. The method of claim 1 wherein the secondary overhead comprises Synchronous Optical Network (SONET) Line Overhead (LOH).

7. The method of claim 1 wherein the secondary overhead comprises Synchronous Optical Network (SONET) Section Overhead (SOH).

8. The method of claim 1 wherein the secondary overhead comprises Synchronous Digital Hierarchy (SDH) Multiplexer Section Overhead (MSOH).

9. The method of claim 1 wherein the secondary overhead comprises Synchronous Digital Hierarchy (SDH) Regenerator Section Overhead (RSOH).

10. The method of claim 1 wherein the secondary overhead comprises Operation, Administration, and Maintenance (OAM) information.

11. A primary communication system to provide a communication service to a secondary communication system, the primary communication system comprising:

a first adaptor assembly configured to receive a primary communication signal from the primary communication network wherein the primary communication signal has primary overhead and a primary payload, receive a secondary communication signal from first equipment in the secondary communication network wherein the secondary communication signal has secondary overhead and a secondary payload, locate unused space in the primary overhead, insert the secondary overhead into the unused space in the primary overhead to form transport overhead, combine the primary payload and the secondary payload to form a transport payload, combine the transport overhead and the transport payload to form a transport communication signal, and transfer the transport communication signal; and a second adaptor assembly configured to receive the transport communication signal from the first adaptor assembly, remove the secondary overhead and the secondary payload from the transport communication signal, combine the secondary overhead and the secondary payload to form the secondary communication signal, and transfer the secondary communication signal to second equipment in the secondary communication network.

12. The primary communication system of claim 11 wherein the unused space comprises unused Synchronous Optical Network (SONET) Line Overhead (LOH) space.

13. The primary communication system of claim 11 wherein the unused space comprises unused Synchronous Optical Network (SONET) Section Overhead (SOH) space.

14. The primary communication system of claim 11 wherein the unused space comprises unused Synchronous Digital Hierarchy (SDH) Multiplexer Section Overhead (MSOH) space.

15. The primary communication system of claim 11 wherein the unused space comprises unused Synchronous Digital Hierarchy (SDH) Regenerator Section Overhead (RSOH) space.

16. The primary communication system of claim 11 wherein the secondary overhead comprises Synchronous Optical Network (SONET) Line Overhead (LOH).

17. The primary communication system of claim 11 wherein the secondary overhead comprises Synchronous Optical Network (SONET) Section Overhead (SOH).

18. The primary communication system of claim 11 wherein the secondary overhead comprises Synchronous Digital Hierarchy (SDH) Multiplexer Section Overhead (MSOH).

19. The primary communication system of claim 11 wherein the secondary overhead comprises Synchronous Digital Hierarchy (SDH) Regenerator Section Overhead (RSOH).

20. The primary communication system of claim 11 wherein the secondary overhead comprises Operation, Administration, and Maintenance (OAM) information.

* * * * *